United States Patent
Muth

(10) Patent No.: US 8,566,466 B2
(45) Date of Patent: Oct. 22, 2013

(54) METHOD AND SYSTEM FOR SWITCHING BETWEEN SUBNETWORK OPERATION AND FULL NETWORK OPERATION

(75) Inventor: Matthias Muth, Stelle (DE)

(73) Assignee: NXP B.V., Eindhoven (NL)

( * ) Notice: Subject to any disclaimer, the term of this patent is extended or adjusted under 35 U.S.C. 154(b) by 1860 days.

(21) Appl. No.: 10/517,246

(22) PCT Filed: Jun. 5, 2003

(86) PCT No.: PCT/IB03/02117
§ 371 (c)(1),
(2), (4) Date: Dec. 7, 2004

(87) PCT Pub. No.: WO03/104037
PCT Pub. Date: Dec. 18, 2003

(65) Prior Publication Data
US 2005/0204204 A1 Sep. 15, 2005

(30) Foreign Application Priority Data

Jun. 10, 2002 (DE) .................................. 102 25 775
Jun. 10, 2002 (DE) .................................. 102 25 776

(51) Int. Cl.
*G06F 15/16* (2006.01)
(52) U.S. Cl.
USPC ........... 709/230; 709/224; 370/241; 370/432; 713/320; 713/323
(58) Field of Classification Search
USPC ........... 709/230, 224; 370/241, 432; 713/320, 713/323
See application file for complete search history.

(56) References Cited

U.S. PATENT DOCUMENTS

| | | | | |
|---|---|---|---|---|
| 5,475,687 A | * | 12/1995 | Markkula et al. | 709/224 |
| 5,581,556 A | * | 12/1996 | Ohie | 370/431 |
| 5,757,773 A | | 5/1998 | Tsuji | |
| 6,047,378 A | * | 4/2000 | Garrett et al. | 713/300 |
| 6,154,061 A | * | 11/2000 | Boezen et al. | 326/86 |
| 6,339,792 B1 | | 1/2002 | Allison et al. | |

(Continued)

FOREIGN PATENT DOCUMENTS

| | | |
|---|---|---|
| EP | 0 506 330 | 9/1992 |
| EP | 0 773 650 | 5/1997 |

(Continued)

*Primary Examiner* — Hadi Armouche
*Assistant Examiner* — Christopher C Harris

(57) ABSTRACT

In order further to develop a method for changing over a serially networked system (100), in particular a serial databus system, from subnetwork operation (T), in which at least one node (22, 28) and/or at least one user (32, 38) of the system (100) is in a state of reduced current consumption and is not addressed and/or not activated by the signal level (40, 42, 44) of the data traffic on the system (100), to full network operation (G), in which all the nodes (20, 22, 24, 26, 28) and/or all the users (30, 32, 34, 36, 38) of the system (100) are addressed and/or activated by the signal level (46, 48) of the data traffic on the system (100), together with a corresponding system (100) in such a way that the nodes (22, 28) and/or the users (32, 38) in the network, i.e. on the databus (10), may be simply yet effectively woken, it is proposed that the system (100) be changed over from subnetwork operation (T) to full network operation (G) through the detection of at least one defined, especially continuous and/or especially symmetrical signal level pattern (62, 64) in the data traffic on the system (100).

14 Claims, 2 Drawing Sheets

(56) References Cited

U.S. PATENT DOCUMENTS

| | | | |
|---|---|---|---|
| 6,463,543 B1 * | 10/2002 | Alvarez | 713/323 |
| 6,493,824 B1 * | 12/2002 | Novoa et al. | 713/162 |
| 6,496,869 B1 * | 12/2002 | Cheng | 709/250 |
| 6,519,720 B1 | 2/2003 | Mores | |
| 6,529,530 B1 * | 3/2003 | Ichii et al. | 370/537 |
| 6,832,251 B1 * | 12/2004 | Gelvin et al. | 709/224 |

FOREIGN PATENT DOCUMENTS

| | | |
|---|---|---|
| EP | 0 863 639 | 9/1998 |
| JP | S60215226 A | 4/1984 |
| WO | WO 97 36398 | 10/1997 |

* cited by examiner

METHOD AND SYSTEM FOR SWITCHING BETWEEN SUBNETWORK OPERATION AND FULL NETWORK OPERATION

The present invention relates to a method for changing over a serially networked system, in particular a serial databus system, from subnetwork operation, in which at least one node and/or at least one user of the system is in a state of reduced current consumption and is not addressed and/or not activated by the signal levels of the data traffic on the system, to full network operation, in which all the nodes and/or all the users of the system are addressed and/or activated by the signal levels of the data traffic on the system.

The present invention also relates to a serially networked system, which is intended to be changed over from subnetwork operation, in which at least one node and/or at least one user of the system is in a state of reduced current consumption and cannot be addressed and/or activated by the signal levels of the data traffic on the system, to full network operation, in which all the nodes and/or all the users of the system may be addressed and/or activated by the signal levels of the data traffic on the system.

With increasingly complex serial networking in particular of automobiles, the energy requirement of the electronic components used in serial networking is also constantly on the increase. Added to this is the fact that ever more comfort functions are also active when the motor vehicle is switched off, having then to be operated directly from the vehicle battery.

Due to the serial networking of a large number of functions by means, for example, of the C[ontroller]A[rea]N[etwork] bus, the entire bus system is always activated even when only a few vehicle functions are in operation, since each bus user is "woken" or "kept awake" by data transmission involving a few users; this leads to undesirably high system current consumption, which, in view of the fact that only a few vehicle functions are in operation, is also wholly unnecessary.

According to the prior art, users in a serially networked system are transferred into a low current consumption state in which the normal bus traffic at normal bus levels does not cause waking. These users are thus in a "selective sleep state", while the remaining users maintain "subnetwork operation".

In order to be able to wake the sleeping nodes or the sleeping users, in the prior art a second level scheme with a markedly different potential is used on the databus, with which the users may be "globally woken"; only when this second level scheme is used for transmission do all the nodes globally wake up. This known principle is used for example in a "Single Wire C[ontroller]A[rea]N[etwork]".

However, a disadvantage of this known principle is that the second level scheme used for waking is associated with markedly increased bus system noise emission; in particular, cyclic wake-up events lead for this reason to undesirable disturbances in the motor vehicle, wherein E[lectro]M[agnetic]C[ompatibility] emissions also play a part; moreover, a second driver stage is necessary, to generate the other level scheme.

Taking as basis the above-described disadvantages and shortcomings and acknowledging the outlined prior art, it is an object of the present invention so to develop a method of the above-mentioned type and a system of the above-mentioned type that the nodes and/or users in the network, i.e. on the databus, may be woken simply yet effectively.

This object is achieved by a method having the features indicated in claim 1 and by a system having the features indicated in claim 4. Advantageous embodiments and expedient further developments of the present invention are identified in the respective dependent claims.

It is therefore proposed according to the invention to use a different waking mechanism instead of the second level scheme in a system which finds itself selectively asleep in subnetwork operation, which different waking mechanism does not exhibit the above-described disadvantages of the prior art. This waking mechanism may be implemented both in system chips and in other networking products, such as for instance in simple transceiver modules.

With regard to the present invention, it is first of all assumed that a number of nodes or a number of users are in a state of reduced current consumption and are thus not woken by the ongoing bus traffic.

So that the present system has the option, in such ongoing subnetwork operation, of waking the "sleeping" nodes or the "sleeping" users immediately and without a rest phase, a special waking data packet is used according to the teaching of the present invention.

This "global waking message" or "global waking data packet" uses the same nominal level scheme but is distinguished by a special bit sequence, which appropriately does not arise in normal communication operation and which may be freely defined in the data field of any desired message or any desired data packet.

In this context, the nodes in the low current consumption state and/or the users in the low current consumption state of the serially networked system may examine the ongoing data traffic on the CAN system bus for an in particular continuous and/or in particular symmetrical data pattern and interpret the detection of this data pattern as a waking event.

As a particularly suitable bit sequence, there is provided a symmetrical data pattern which is linked to any identifier (address/header), of which there is at least one, and which may be simply detected by simple hardware, specifically without the need for a protocol controller.

Thus, a decisive advantage consists in the fact that the protocol used does not have to be tracked in bit-accurate manner and that, moreover, it is not essential to use a special message identifier (address/header), but rather any desired message identifier (address/header) may be used; all that is needed is detection of a symmetrical pattern which may be repeated appropriately frequently in the data field of the message or data packet.

The more data bytes are used, the more frequently this pattern may be present therein and the better it may be filtered for. The data patterns used may be of any desired type and are distinguished merely by the frequent repetition of identical bit phases. To filter such data patterns, it is possible to use both per se known analog circuits and per se known digital circuits.

According to a particularly inventive further development of the present method and of the present system, a changeover from subnetwork operation to full network operation may also occur if a signal rest level and/or no change in the signal level is noted on the system for a period which is greater than a critical period of definable or settable length.

The critical period is preferably selected to be greater than the interval between the individual messages or data packets of the data traffic on the system.

According to one advantageous development, messages or data packets are sent by at least one of the nodes participating in subnetwork operation and/or at least one of the users participating in subnetwork operation at cyclic intervals which are smaller than the critical period.

The present invention further relates to a transceiver unit, in particular for carrying out a method of the type described above and/or in particular associated with at least one system of the type described above; the transceiver unit is connected to at least one serial databus, in particular to at least one C[ontroller]A[rea]N[etwork] bus, and is in communication with at least one microcontroller unit which is provided to carry out at least one application.

According to a preferred further development of the present invention, at least one control logic is associated with the transceiver unit and/or at least one control logic is implemented in the transceiver unit.

The present invention further relates to a voltage regulator which is connected to at least one battery unit, and which is in communication with at least one transceiver unit, in particular of the type described above, which voltage regulator is intended to supply a voltage to at least one microcontroller unit, provided to execute at least one application, if at least one defined, in particular continuous and/or in particular symmetrical signal level pattern is detected by the transceiver unit in at least one incoming message associated with at least one application and occurring on at least one serial databus, in particular on at least one C[ontroller]A[rea]N[etwork] bus.

The present invention further relates to a chip unit, in particular a system chip unit, for addressing and/or activating at least one microcontroller unit which is provided to carry out at least one application and which is associated with at least one serial databus, in particular at least one C[ontroller]A[rea]N[etwork] bus; which chip unit comprises
  at least one transceiver unit of the type described above, and
  at least one voltage regulator of the type described above.

The present invention further relates to a microcontroller unit provided to carry out at least one application and associated with at least one serial data bus, in particular at least one C[ontroller]A[rea]N[etwork] bus, which microcontroller unit is to be supplied with a voltage only if at least one defined, in particular continuous and/or in particular symmetrical signal level pattern is detected in at least one incoming message associated with at least one application and occurring on the databus, by at least one transceiver unit, in particular according to the type described above.

According to a preferred further development of the present invention, the microcontroller unit can be activated by the transceiver unit.

The present invention finally relates to the use of
  a method of the type described above and/or
  at least one system of the type described above and/or
  at least one chip unit of the type described above and/or
  at least one microcontroller unit of the type described above in automobile electronics, in particular in motor vehicle electronics.

As has already been described above, there are various possible ways in which the teaching of the present invention may advantageously be embodied and refined. On the one hand, reference can be made in this connection to the claims dependent on claims 1, 4, 9 and 13, and on the other, further aspects, features and advantages of the present invention are apparent from and will be elucidated with reference to the illustrative embodiment shown in FIGS. 1 to 4.

Figure 1:
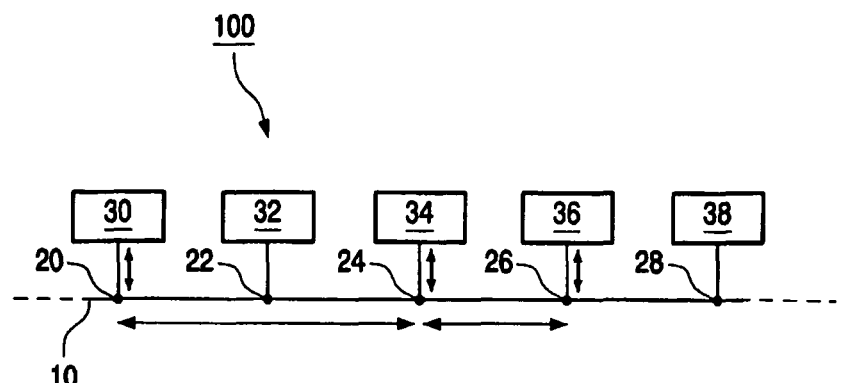
FIG. 1 is a schematic block diagram of an example of embodiment of a system according to the present invention based on the method of the present invention.
Figure 2:
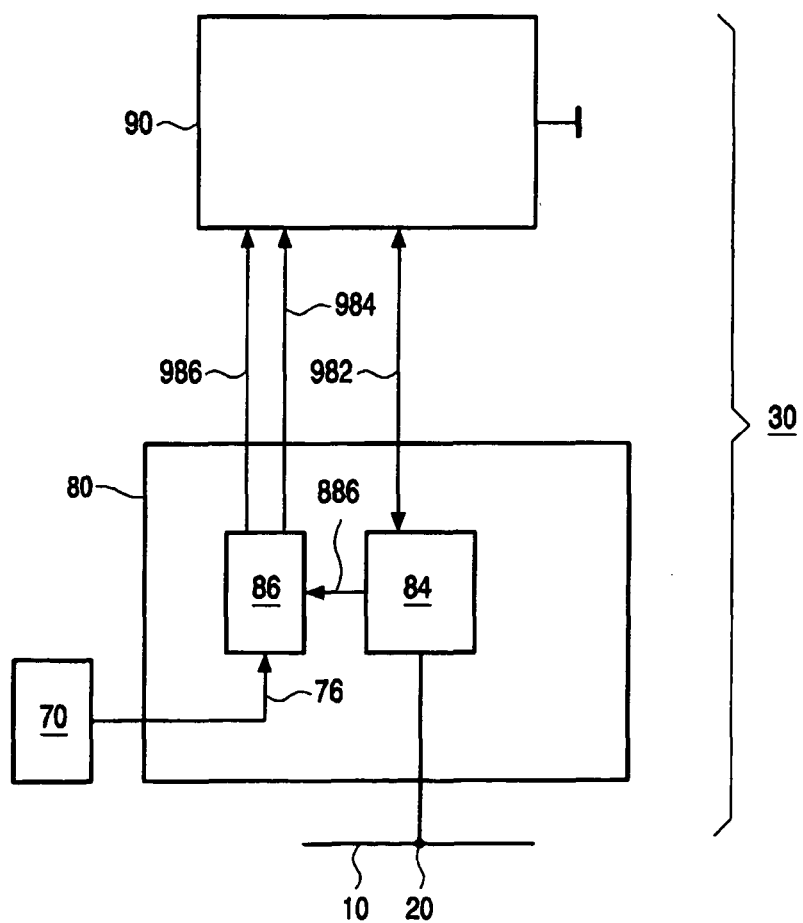
FIG. 2 is a schematic block diagram of a detailed section of the system shown in FIG. 1.
Figure 3:
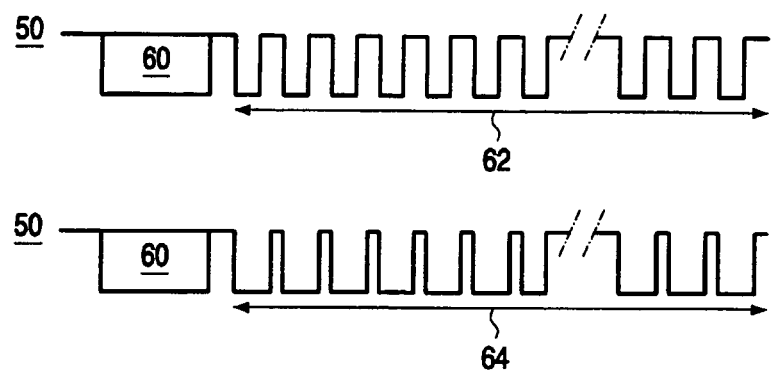
Figure 4:
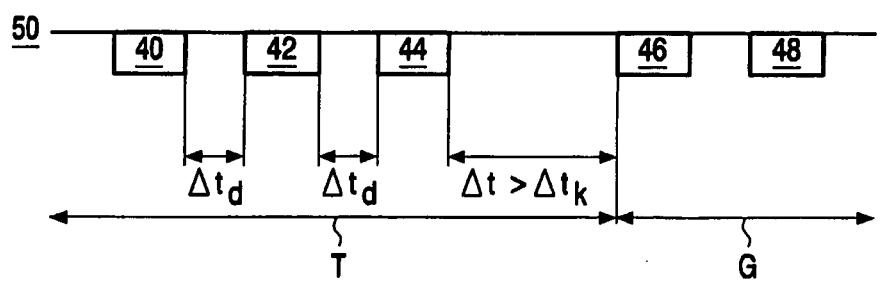

FIG. 3 is a schematic representation of an example of embodiment of a defined signal level pattern not otherwise occurring in the ongoing data traffic, in the event of changeover, according to the method, of the system of FIGS. 1 and 2 from subnetwork operation to full network operation; and FIG. 4 shows, in a schematic time sequence, an example of embodiment of a changeover of the system of FIGS. 1 and 2 from subnetwork operation to full network operation.

FIG. 1 shows an exemplary implementation of a serially networked CAN system 100 provided for C[ontroller]A[rea]N[etwork] applications in automobile electronics, namely in motor vehicle electronics.

This serially networked system 100 comprises five users 30, 32, 34, 36, 38, which are connected to a serial C[ontroller]A[rea]N[etwork] databus 10 via respective associated nodes 20, 22, 24, 26, 28 and which take the form, for example, of a system chip unit (optionally including transceiver unit) or of a microcontroller unit, for instance of an application controller unit or of a protocol controller unit.

Next, in FIG. 2 the build-up, the function and the structure of the users 30, 32, 34, 36, 38 provided to execute applications are explained in an exemplary manner by means of a detailed description of the first user 30, which is connected to the node 20 of the CAN databus 10 and which can be addressed and/or activated via this CAN databus 10. The operating principle is as follows:

If, in the case of a system 100 change-over (cf. FIG. 1) according to the method from subnetwork operation to full network operation (cf. FIG. 4), a defined, for example continuous and/or for example symmetrical signal level pattern (=so-termed "data pattern" cf. FIG. 3) is detected in the data or message traffic on the CAN data bus line which otherwise does not occur in the data or message traffic, by the node 20 which is in a state of reduced current consumption and/or by the user 30 which is in a state of reduced current consumption, and in this regard in particular by a transceiver unit 84 equipped with a control logic and connected to the data bus 10 and/or by a system chip unit 80 which accommodates the transceiver unit 84 and which is permanently supplied from a battery unit 70, then the transceiver unit 84 switches on a voltage regulator 86 which is connected to the battery unit 70 via a supply line 76 and which is in communication 886 with the transceiver unit 84.

After that, the application is started completely via a connection line 984 in that the voltage regulator 86 supplies a voltage to the application user which takes the form of a microcontroller unit 90 with integrated CAN control unit; as shown in FIG. 2, between the voltage regulator 86 and the (application) microcontroller unit 90 there is also a reset line 986 ("reset").

If, however, the pattern detector (or transceiver 84) does not detect the presence of any message on the CAN databus 10, then the voltage regulator 86 is not switched on.

The system 100 may be configured and controlled via a mode control interface 982 between the transceiver unit 84 (or the system chip unit 80) and the microcontroller unit 90.

In addition, it is noted in respect of the example of embodiment of the present invention illustrated by means of FIG. 2 that for the change-over it is not important whether use is made of an integrated system chip 80 or of discrete components such as transceiver 84 and voltage regulator 86.

Of the five users 30, 32, 34, 36, 38, the first user 30 of which has been described by way of example hereinabove with reference to FIG. 2, two users 32, 38, as shown in FIG. 1, are in a low current consumption state, in which these two users 32, 38 are not addressed and thus also not activated by the signal level 40, 42, 44 (cf. FIG. 4) of the data traffic on the system 100.

The remaining three active users 30, 34, 36 define subnetwork operation T, i.e. the three users 30, 34, 36 communicate with one another (this is symbolized by the double-headed arrow between the active user 30 and the active user 34 and by the double-headed arrow between the active user 34 and the active user 36) and are addressed by the signal level of the data traffic on the system 100.

The system 100 is now changed over immediately and without a rest phase from ongoing subnetwork operation T (="sleeping" nodes 22, 28 or "sleeping" users 32, 38) to full network operation G, in which all the nodes 20, 22, 24, 26, 28 or all the users 30, 32, 34, 36, 38 are addressed by the signal level of the data traffic on the system 100, by using a special waking data packet (c.f. FIG. 3).

This "global waking message" or "global waking data packet" uses the same nominal level scheme but is distinguished by a special bit sequence, which does not arise in normal communication operation and which may be freely defined in the data field of any desired message or any desired data packet.

In this context, the users 32, 38 in the low current consumption state of the serially networked system 100 may examine the ongoing data traffic on the CAN system bus 10 for a continuous symmetrical data pattern and interpret the detection of this symmetrical data pattern as a waking event.

As a particularly suitable bit sequence, there is provided a symmetrical data pattern 62 or 64 which is linked to any identifier 60 (address/header), of which there is at least one, and which may be simply detected by simple hardware, specifically without the need for a protocol controller.

Thus, a decisive advantage consists in the fact that the protocol used does not have to be tracked in bit-accurate manner and that, moreover, it is not essential to use a special message identifier (address/header), but rather any desired message identifier 60 (address/header) may be used; all that is needed is detection of a symmetrical pattern which may be repeated appropriately frequently in the data field of the message or data packet.

The more data bytes are used, the more frequently this pattern may be present therein and the better it may be filtered for. The data pattern used may be of any desired type and are distinguished merely by the frequent repetition of identical bit phases. To filter such data patterns, it is possible to use both per se known analog circuits and per se known digital circuits.

Alternatively or in addition thereto, the system 100 may also be changed over from subnetwork operation T to full network operation G in that a signal rest level 50 is noted on the system 100, i.e. in particular no change is noted in the signal level (=so-called rest phase), for a period $\Delta t$; this rest phase period $\Delta t$ is greater than a critical period $\Delta t_k$ of definable and settable length.

On the other hand, this critical period $\Delta t_k$ is in turn set to be greater than the interval $\Delta t_d$ between the individual messages and data packets of the data traffic on the system 100, such that the normal time gaps $\Delta t_d$ between the messages and data packets of subnetwork operation T are insufficient for detecting the end of subnetwork operation T.

Accordingly, the nodes 20, 24, 26 or the users 30, 34, 36 send messages and data packets during subnetwork operation T at cyclic intervals which are smaller than the critical period $\Delta t_k$, so as to ensure that the "selectively sleeping" nodes 22, 28 or the "selectively sleeping" users 32, 38 are not woken during subnetwork operation T.

To summarize, it may thus be stated that the method illustrated in FIG. 3 allows the implementation of subnetwork operation T within a serial bus system 10. Parts (="selectively sleeping" nodes 22, 28, or "selectively sleeping" users 32, 38) of the networked system 100 shown in FIGS. 1 and 2 may remain in a reduced current consumption state, whereas other parts (="active" nodes 20, 24, 26 or "active" users 30, 34, 36) communicate with one another in subnetwork operation T and do not wake the parts in the reduced current consumption state.

In order to wake these "sleeping" nodes 22, 28 or "sleeping" users 32, 38, an appropriately designed symmetrical data pattern 62, 64 (c.f. FIG. 3) is used within any desired messages or data packets, so as to "wake" the "sleeping" nodes 22, 28 or the "sleeping" users 32, 38 without the need for a time-based bus system rest phase $\Delta t$ (=no communication).

Alternatively or in addition thereto, a certain time period $\Delta t > \Delta t_k$ without communication on the databus 10 may be used to allow waking of these "sleeping" nodes 22, 28 or "sleeping" users 32, 38 by a normal message or data packet; the criterion for addressing all the nodes 20, 22, 24, 26, 28 or all the users 30, 32, 34, 36, 38 on the databus 10 is thus that a bus system rest phase $\Delta t$ was present beforehand which is greater than the settable critical period $\Delta t_k$.

LIST OF REFERENCE NUMERALS 100 serially networked system, in particular serial databus system
10 serial databus, in particular C[ontroller]A[rea]N[etwork] bus
20 first node of the system 100
22 second node of the system 100
24 third node of the system 100
26 fourth node of the system 100
28 fifth node of the system 100
30 first user of the system 100
32 second user of the system 100
34 third user of the system 100
36 fourth user of the system 100
38 fifth user of the system 100
40 first signal level on databus 10
42 second signal level on databus 10
44 third signal level on databus 10
46 fourth signal level on databus 10
48 fifth signal level on databus 10
50 signal rest level on databus 10
60 identifier (address/header)
62 first symmetrical data pattern
64 second symmetrical data pattern
70 battery unit
76 connection between battery unit 70 and voltage regulator 86
80 chip unit, in particular system chip unit
84 transceiver unit of the chip unit 80
86 voltage regulator of the chip unit 80
886 connection between transceiver unit 84 and voltage regulator 86
90 microcontroller unit
982 interface between transceiver unit 84 and microcontroller unit 90
984 connection between voltage regulator 86 and microcontroller unit 90
986 reset line between voltage regulator 86 and microcontroller unit 90
G full network operation
T subnetwork operation
$\Delta t$ time period
$\Delta t_d$ interval
$\Delta t_k$ critical period

The invention claimed is:
1. A method for changing over a serial databus system, the method comprising:

operating the system in subnetwork operation in which at least one node and/or at least one chip unit of the system is in a state of reduced current consumption and is not addressed and/or not activated by a signal level of data traffic on the system;

detecting at least one defined continuous and/or symmetrical signal level pattern in the data traffic on the system; and in response to detection of the at least one defined continuous and/or symmetrical signal level pattern in the data traffic, changing the system from the subnetwork operation to a full network operation in which all the nodes and/or all the chip units of the system are addressed and/or activated by the signal level of the data traffic on the system.

2. A method as claimed in claim 1, characterized in that the signal level pattern does not otherwise occur in the data traffic.

3. A method as claimed in claim 1, characterized in that the signal level pattern is detected by at least one node in the reduced current consumption state and/or by at least one chip unit in the reduced current consumption state.

4. A method as claimed in claim 1 performed at least partly by a transceiver unit, characterized in that the transceiver unit is connected to at least one Controller Area Network (CAN) bus, and is in communication with at least one microcontroller unit which is provided to carry out at least one application.

5. A method as claimed in claim 4 performed at least partly by the transceiver unit characterized by at least one control logic associated with the transceiver unit and/or implemented in the transceiver unit.

6. A method as claimed in claim 4 performed at least partly by a voltage regulator which is connected to at least one battery unit, and which is in communication with the at least one transceiver unit which voltage regulator is configured to supply a voltage to at least one microcontroller unit, provided to execute at least one application, in the event of detection, by the transceiver unit, of at least one defined, in particular continuous and/or in particular symmetrical signal level pattern in at least one incoming message associated with at least one application and occurring on at least one Controller Area Network (CAN) bus.

7. A method as claimed in claim 4 performed at least partly by a chip unit, in particular a system chip unit, for addressing and/or activating at least one microcontroller unit which is provided to carry out at least one application and which is associated with at least one Controller Area Network (CAN) bus; characterized by the at least one transceiver unit and at least one voltage regulator, which is connected to at least one battery unit, and which is in communication with at the at least one transceiver unit, the voltage regular being configured to supply a voltage to the at least one microcontroller unit.

8. A method as claimed in claim 4 performed at least partly by a microcontroller unit provided to carry out at least one application and associated with at least one Controller Area Network (CAN) bus, which microcontroller unit is to be supplied with a voltage only if at least one defined, in particular continuous and/or in particular symmetrical signal level pattern is detected in at least one incoming message associated with at least one application and occurring on the databus, by the at least one transceiver unit.

9. A method as claimed in claim 8 performed at least partly by the microcontroller unit characterized in that the microcontroller unit is activated by the transceiver unit.

10. A serially networked system comprising:
a serial databus; and
a plurality of chip units that are connected to the serial databus via respective nodes, the chip units being configured to;
operate the system in subnetwork operation in which at least one node and/or at least one chip unit of the system is in a state of reduced current consumption and is not addressed and/or not activated by a signal level of data traffic on the system;
detect at least one defined continuous and/or symmetrical signal level pattern in the data traffic on the system; and
in response to detection of the at least one defined continuous and/or symmetrical signal level pattern in the data traffic, change the system from the subnetwork operation to a full network operation in which all the nodes and/or all the chip units of the system are addressed and/or activated by the signal level of the data traffic on the system.

11. A system as claimed in claim 10, characterized in that the signal level pattern does not otherwise occur in the data traffic.

12. A system as claimed in claim 10, characterized in that the signal level pattern is detected by at least one node and/or chip unit in the reduced current consumption state.

13. A system as claimed in claim 10, characterized in that the system comprises at least one Controller Area Network (CAN) bus.

14. A system as claimed in claim 10, characterized in that the chip unit takes the form of at least one chip unit, in particular at least one system chip unit, and/or at least one microcontroller unit provided for carrying out at least one application.

* * * * *